US009282025B2

(12) United States Patent
Tan

(10) Patent No.: US 9,282,025 B2
(45) Date of Patent: Mar. 8, 2016

(54) MEDIUM ACCESS CONTROL ADDRESS PROTECTION METHOD AND SWITCH

(71) Applicant: Huawei Technologies Co., Ltd., Shenzhen (CN)

(72) Inventor: Zhaoyuan Tan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 229 days.

(21) Appl. No.: 13/691,261

(22) Filed: Nov. 30, 2012

(65) Prior Publication Data

US 2013/0094510 A1 Apr. 18, 2013

Related U.S. Application Data

(63) Continuation of application No. PCT/CN2011/076383, filed on Jun. 27, 2011.

(51) Int. Cl.
*H04L 12/751* (2013.01)
*H04L 29/06* (2006.01)
*H04L 12/46* (2006.01)
(Continued)

(52) U.S. Cl.
CPC .............. *H04L 45/02* (2013.01); *H04L 12/4637* (2013.01); *H04L 45/22* (2013.01); *H04L 45/28* (2013.01); *H04L 63/1441* (2013.01); *H04L 45/66* (2013.01)

(58) Field of Classification Search
CPC ............................ H04L 45/66; H04L 12/4637
USPC ........................................................ 370/222
See application file for complete search history.

(56) References Cited

U.S. PATENT DOCUMENTS 6,556,541 B1 * 4/2003 Bare ............................ 370/235
6,628,661 B1 9/2003 Goldman et al.
(Continued)

FOREIGN PATENT DOCUMENTS

CN 1388683 A 1/2003
CN 101060498 A 10/2007
(Continued)

OTHER PUBLICATIONS

Office Action issued in corresponding Chinese Patent Application No. 201180000937.3, mailed Jan. 30, 2013.
(Continued)

*Primary Examiner* — Guang Li
(74) *Attorney, Agent, or Firm* — Brinks Gilson & Lione

(57) ABSTRACT

The present disclosure discloses a MAC address protection method and switch. A switch in a layer 2 ring network obtains network topology information of the layer 2 ring network, the network topology information includes a protection MAC address of a protected device, an identifier of a switch corresponding to the protection MAC address, and an identifier of each switch in the layer 2 ring network, wherein the protection MAC address is the MAC address of the protected device; and determines a local outgoing interface of the protection MAC address of the protected device according to the network topology information, establishes and stores an outgoing interface of an MAC entry corresponding to the protection MAC address according to the local outgoing interface of the protection MAC address, thereby ensuring the protected device to correctly send and receive messages to meet the topology change of the layer 2 ring network.

7 Claims, 4 Drawing Sheets

(51) Int. Cl.
*H04L 12/707* (2013.01)
*H04L 12/703* (2013.01)
*H04L 12/721* (2013.01)

(56) References Cited

U.S. PATENT DOCUMENTS

| | | | | |
|---|---|---|---|---|
| 7,516,487 | B1* | 4/2009 | Szeto | H04L 63/0263 726/11 |
| 8,065,725 | B2* | 11/2011 | Zheng | H04L 63/0823 709/200 |
| 8,737,198 | B1 | 5/2014 | Holness et al. | 370/222 |
| 2003/0208571 | A1 | 11/2003 | Yik et al. | |
| 2005/0068903 | A1* | 3/2005 | Perlman | 370/256 |
| 2005/0073998 | A1* | 4/2005 | Zhu et al. | 370/352 |
| 2006/0092856 | A1* | 5/2006 | Mitsumori | 370/254 |
| 2007/0076719 | A1* | 4/2007 | Allan et al. | 370/392 |
| 2007/0204068 | A1* | 8/2007 | Oku et al. | 709/251 |
| 2008/0095047 | A1* | 4/2008 | Skalecki et al. | 370/225 |
| 2008/0259920 | A1* | 10/2008 | Cheng et al. | 370/390 |
| 2008/0316918 | A1* | 12/2008 | Sakauchi | 370/223 |
| 2008/0317030 | A1* | 12/2008 | Rhee et al. | 370/392 |
| 2009/0172156 | A1 | 7/2009 | Yadav et al. | |
| 2010/0095123 | A1* | 4/2010 | He | H04L 63/1441 713/171 |
| 2010/0110881 | A1* | 5/2010 | Ryoo et al. | 370/225 |
| 2010/0189114 | A1* | 7/2010 | Oishi | H04L 12/2697 370/400 |
| 2010/0246387 | A1* | 9/2010 | Krishnan et al. | 370/225 |
| 2010/0290340 | A1* | 11/2010 | Lee et al. | 370/225 |
| 2010/0296391 | A1* | 11/2010 | Ling et al. | 370/217 |
| 2010/0296416 | A1* | 11/2010 | Lee et al. | 370/258 |
| 2010/0316057 | A1* | 12/2010 | Shiraki et al. | 370/401 |
| 2011/0019536 | A1* | 1/2011 | Kim et al. | 370/223 |
| 2011/0019538 | A1* | 1/2011 | Ryoo et al. | 370/225 |
| 2011/0019679 | A1* | 1/2011 | Akahane et al. | 370/401 |
| 2011/0075584 | A1* | 3/2011 | Teramoto | 370/252 |
| 2011/0158241 | A1* | 6/2011 | Wang et al. | 370/395.53 |
| 2011/0274010 | A1* | 11/2011 | Kwon et al. | 370/258 |
| 2012/0092983 | A1* | 4/2012 | Song | 370/217 |
| 2013/0177021 | A1* | 7/2013 | Kitayama et al. | 370/392 |
| 2014/0010071 | A1* | 1/2014 | Kim et al. | 370/223 |
| 2014/0241148 | A1* | 8/2014 | Ryoo et al. | 370/222 |

FOREIGN PATENT DOCUMENTS

| | | |
|---|---|---|
| CN | 102104519 A | 6/2011 |
| EP | 1863217 A1 | 12/2007 |
| WO | WO 2008077414 A1 | 7/2008 |
| WO | WO 2010022576 A1 * | 3/2010 |

OTHER PUBLICATIONS

English Translation of International Search Report issued in corresponding PCT Application No. PCT/CN2011/076383; mailed Apr. 5, 2012.

Extended European Search Report issued in corresponding European Patent Application No. 11857589.3, mailed Dec. 20, 2012.

* cited by examiner

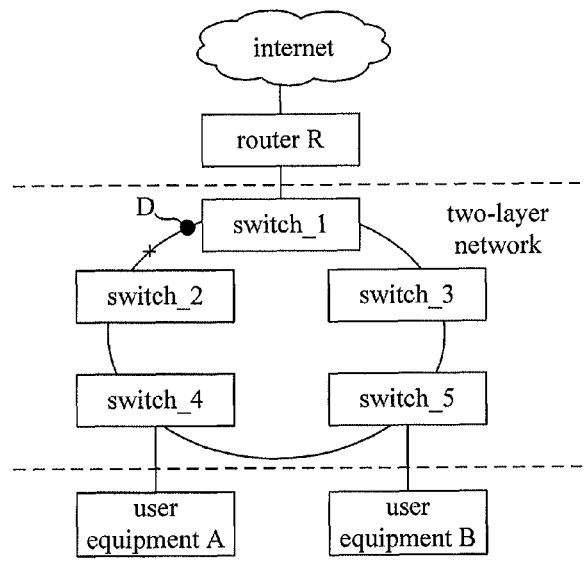

Fig. 1c

| A switch in a layer 2 ring network obtains network topology information of the layer 2 ring network, the network topology information of the layer 2 ring network includes a protection MAC address of a protected device, an identifier of a switch corresponding to the protection MAC address, and an identifier of each switch in the layer 2 ring network, wherein the protection MAC address is the MAC address of the protected device | 201 |

| The switch in the layer 2 ring network determines a local outgoing interface of the protection MAC address of the protected device according to the network topology information, establishes and stores an outgoing interface of an MAC entry corresponding to the protection MAC address according to the local outgoing interface of the protection MAC address | 202 |

Fig. 2

MEDIUM ACCESS CONTROL ADDRESS PROTECTION METHOD AND SWITCH

CROSS-REFERENCE TO RELATED APPLICATIONS

This application is a continuation of International Application No. PCT/CN2011/076383, filed on Jun. 27, 2011, which is hereby incorporated by reference in its entirety.

FIELD

The embodiments of the present disclosure relate to a field of communication technology, and particularly to a Medium Access Control (MAC) address protection method and switch.

BACKGROUND

In the networking solutions of a Metropolitan Area Network and an enterprise network, a layer 2 ring network technology is used more and more frequently. In the layer 2 ring network, a switch forwards a message in a process as follows: firstly, searching for an MAC entry according to a destination MAC address of the message, obtaining an outgoing interface for the message via the MAC entry, and sending the message from the outgoing interface, wherein the MAC entry of the switch is learnt according to the received data stream. For example, when receiving a data message from a certain interface, the switch may learn the MAC entry according to a source MAC address of the message, wherein the MAC entry includes the source MAC address and the outgoing interface of the message, and the outgoing interface is an interface from which the switch receives the message. In a case that the MAC address of the switch is attacked, the outgoing interface in the MAC entry is learnt as a wrong interface, thus a message having the MAC address as the destination address may be forwarded to the wrong interface. FIG. 1a illustrates a schematic diagram of an attack by counterfeiting the MAC address in an existing layer 2 ring network. When a user equipment A attacks by counterfeiting the MAC address of a router, the user equipment A constructs a message having the MAC address of a router R as the source MAC address, and sends the message to the layer 2 ring network. By learning the MAC address, the outgoing interface corresponding to the MAC address of the router R in the MAC entry of each switch in the layer 2 ring network is modified as an interface to the user equipment A, a message sent from other users and having the router R as the destination address will be forwarded to the user equipment A, thus the network to the router R is interrupted, and the information of other users is illegally obtained. Similarly, when the user equipment A attacks by counterfeiting the MAC address of a user equipment B to construct a message, a message sent from the router R to the user equipment B will be forwarded to the user equipment A, thus the network from the user equipment B to the router R is interrupted, and the information of the user equipment B is stolen by the user equipment A, wherein D is a ring network blocking point.

In order to prevent the MAC address from being attacked by a user, the MAC addresses of the router and all users under the layer 2 ring network may be configured as static MAC addresses on respective switches in the layer 2 ring network. Since the switch does not need to learn any static MAC address, the static MAC address will not be attacked. But the static configuration method requires each switch in the layer 2 ring network configure the MAC addresses of the router and the users under other switches as static MAC addresses, and the configuration process is complicated. In order to reduce the complexity of the static configuration, the interface security characteristics may be activated at the ring network interface of the switch, and the switch automatically converts the learnt MAC address into a static MAC address, so as to prevent the MAC address from being attacked. This method can avoid the complicated configuration process of the static MAC address. However, whether performing a static configuration or securely learning an MAC address through a ring network interface and converting it into a static MAC address, a traffic interruption always will be caused when the ring network topology of the layer 2 ring network is changed. FIG. 1b illustrates is a network schematic diagram of a protection of the MAC address of the router using a static configuration. In initial situation, all the links of the layer 2 ring network are normal, and each switch configures the MAC address of the router R as a static MAC address, wherein D is a ring network blocking point, and the outgoing interfaces corresponding to the MAC addresses of the router R configured on respective switches are as follows:

switch_2: an interface connected to switch_1;
switch_3: an interface connected to switch_1;
switch_4: an interface connected to switch_2;
switch_5: an interface connected to switch_3.

In a case that the ring network topology of the layer 2 ring network is changed, as shown in FIG. 1c, which illustrates a network schematic diagram with a failure of protecting the MAC address of the router using a static configuration, when the link between switch_1 and switch_2 fails, the ring network enables the link between switch_4 and switch_5, i.e., canceling the ring network blocking point between switch_4 and switch_5, and a ring network blocking point D may be set between switch_1 and switch_2. However, the outgoing interface on switch_4 corresponding to the MAC address of the router R is still the interface connected to switch_2, thus a message sent from the user equipment A to the router R is still forwarded by switch_4 to switch_2. Due to the link failure between switch_2 and switch_1, switch_2 cannot forward the message to the router R through switch_1, thereby causing an interruption of the traffic from the user equipment A to the router R.

In summary, when the network topology of the layer 2 ring network is changed, the current solution for preventing an attack on the MAC address will easily cause an interruption of the network traffic.

SUMMARY

The embodiments of the present disclosure provide a Medium Access Control (MAC) address protection method and a switch having a processor, so as to solve the deficiency that when the network topology of the layer 2 ring network is changed, the current solution for preventing an attack on the MAC address will easily cause an interruption of the network traffic. Thus a user message can be correctly forwarded while the MAC address is protected, even if the network topology of the layer 2 ring network is changed.

A first aspect of the present disclosure provides an MAC address protection method implemented in a switch. The method includes: obtaining, by a switch in a layer 2 ring network, network topology information of the layer 2 ring network, where the network topology information of the layer 2 ring network includes a protection MAC address of a protected device, an identifier of a switch corresponding to the protection MAC address, and an identifier of each switch in the layer 2 ring network, the protection MAC address is the MAC address of the protected device; and determining, by the switch in the layer 2 ring network, a local outgoing interface of the protection MAC address of the protected device according to the network topology information, establishing and storing an outgoing interface of an MAC entry corresponding to the protection MAC address according to the local outgoing interface of the protection MAC address.

A second aspect of the present disclosure further provides a switch having a processor. The switch includes: an outgoing interface determination module configured to obtain, by the processor, network topology information of a layer 2 ring network, where the network topology information of the layer 2 ring network includes a protection MAC address of a protected device, an identifier of a switch corresponding to the protection MAC address, and an identifier of each switch in the layer 2 ring network, the protection MAC address is the MAC address of the protected device. The switch also includes an MAC entry establishment module configured to determine, by the processor, a local outgoing interface of the protection MAC address of the protected device according to the network topology information, establish and store an outgoing interface of an MAC entry corresponding to the protection MAC address according to the local outgoing interface of the protection MAC address.

The MAC address protection method and the switch according to the embodiments of the present disclosure take the MAC address of the protected device as the protection MAC address, determine the outgoing interface corresponding to the protection MAC address on the switch in the layer 2 ring network according to the network topology information including the protection MAC address of the protected device, the identifier of the switch corresponding to the protection MAC address and the identifier of each switch in the layer 2 ring network, and synchronously update the outgoing interface of the MAC entry corresponding to the protection MAC address when the topology of the layer 2 ring network is changed, thereby ensuring the protected device to correctly send and receive messages to meet the topology change of the layer 2 ring network.

BRIEF DESCRIPTION OF THE DRAWINGS

To describe the solutions of the embodiments of the present disclosure or the prior art more clearly, the accompanying drawings to be used in the descriptions of the embodiments or the prior art are briefly introduced as follows. Apparently, the accompanying drawings in the following description just illustrate some embodiments of the present disclosure, and a person skilled in the art may further derive other accompanying drawings from these accompanying drawings without making creative effort.

FIG. 1c is a network schematic diagram with a failure of protecting the MAC address of a router using a static configuration;

FIG. 2 is a flowchart of an MAC address protection method according to an embodiment of the present disclosure;

DETAILED DESCRIPTION OF THE EMBODIMENTS

Figure 1A:
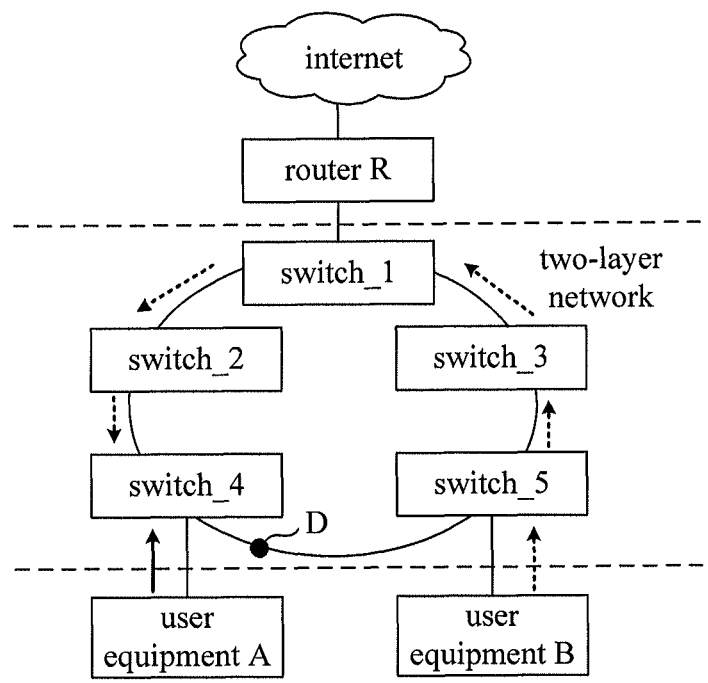
FIG. 1a is a schematic diagram of an attack by counterfeiting an MAC address in an existing layer 2 ring network.

In order to make the objects, solutions and advantages of the present disclosure clearer, the solutions of the embodiments of the present disclosure will be clearly and completely described as following with reference to the accompanying drawings. Apparently, the described embodiments are just a part of embodiments of the present disclosure rather than all the embodiments. Based on the embodiments of the present disclosure, any other embodiment obtained by a person skilled in the art without paying a creative effort will fall within the protection scope of the present disclosure.

FIG. 2 is a flowchart of an MAC address protection method according to an embodiment of the present disclosure. As shown in FIG. 2, the MAC address protection method includes:

Step 201: a switch in a layer 2 ring network obtains network topology information of the layer 2 ring network, the network topology information of the layer 2 ring network includes a protection MAC address of a protected device, an identifier of a switch corresponding to the protection MAC address, and an identifier of each switch in the layer 2 ring network, wherein the protection MAC address is the MAC address of the protected device.

Wherein, the protection MAC address of the protected device and the identifier of the switch corresponding to the protection MAC address are initially released by an access switch of the protected device. The access switch refers to a switch directly connected to the protected device. The interface directly connecting the access switch with the protected device is an outgoing interface corresponding to the protection MAC address on the access switch.

The access switch may enable an MAC protection on the interface directly connecting the protected device with the access switch, or configure the MAC address of the protected device as protection MAC address on the access switch.

Next, the access switch interacts the network topology information with other switches in the layer 2 ring network, wherein the network topology information includes the protection MAC address of the protected device, the identifier of the switch corresponding to the protection MAC address, and the identifier of each switch in the layer 2 ring network, etc. the Other switches refer to those not directly connected to the protected device in the layer 2 ring network, i.e., the switches in the layer 2 ring network except the access switch of the protected device.

Step 202: the switch in the layer 2 ring network determines a local outgoing interface of the protection MAC address of the protected device according to the network topology information, establishes and stores an outgoing interface of an MAC entry corresponding to the protection MAC address according to the local outgoing interface of the protection MAC address.

Wherein, step 202 may include the following situations:

I. If a certain switch in the layer 2 ring network is the switch corresponding to the protection MAC address of the protected device, the switch writes the interface directly connected to the protected device into the MAC entry, as the outgoing interface of the protection MAC address on the access switch.

II. If a certain switch in the layer 2 ring network is another switch other than the switch corresponding to the protection MAC address, the another switch shall compute a local outgoing interface of the protection MAC address, and the specific computation process may include:

the switch in the layer 2 ring network computes the distances from its two interfaces in the layer 2 ring network to the access switch corresponding to the protection MAC address; and selecting an interface having a shorter distance to the access switch corresponding to the protection MAC address as the local outgoing interface of the protection MAC address;

wherein, if there is a ring network blocking point in the path from an interface to the access switch corresponding to the protection MAC address, the distance between the interface and the access switch corresponding to the protection MAC address is infinite.

Further, since the layer 2 ring network may have a single ring or multiple rings, the switch corresponding to the protection MAC address may include:

I. If the layer 2 ring network has a single ring, the switch corresponding to the protection MAC address is the access switch.

II. If the layer 2 ring network includes a primary ring and at least one level of sub-rings, in any sub-ring, the switch corresponding to the protection MAC address is a switch connecting the sub-ring with a higher level ring network, or one of two switches connecting the sub-ring with the higher level ring network. For example, when the identifier of the switch corresponding to the protection MAC address received by the switch connecting the sub-ring with the primary ring is the identifier of the access switch of the protected device, the identifier of the switch connecting the sub-ring with the primary ring can be determined as the identifier of the switch corresponding to the protection MAC address.

Further, in order to ensure the accuracy of the network topology information, each switch in the layer 2 ring network obtains the updated network topology information according to the topology change event and a new ring network blocking point in the layer 2 ring network, when the topology of the layer 2 ring network is changed, then updates the outgoing interface of the MAC entry corresponding to the protection MAC address locally stored according to the changed network topology information and the new ring network blocking point, i.e., repeating steps 201 and 202.

Figure 3:
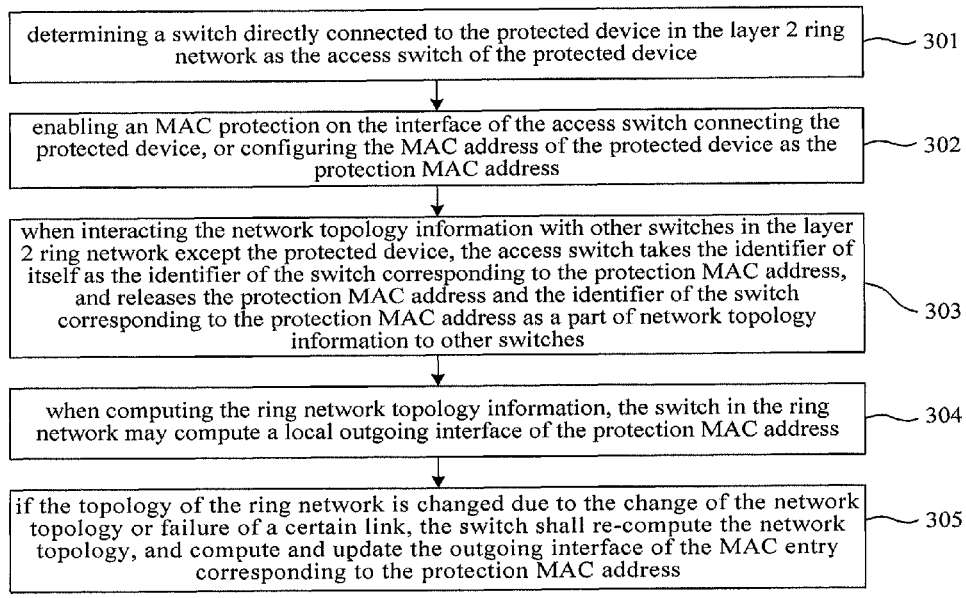
FIG. 3 is a flowchart of another MAC address protection method according to an embodiment of the present disclosure.

FIG. 3 illustrates a flowchart of another MAC address protection method according to an embodiment of the present disclosure. In a case that the layer 2 ring network has a single ring, the MAC address protection method may include:

Step 301: determining a switch directly connected to the protected device, e.g., router, user equipment, etc., in the layer 2 ring network as the access switch of the protected device. For example, referring to FIG. 1b, the access switch of router R is switch_1, and the access switch of user equipment B is switch_5.

Step 302: enabling an MAC protection on the interface of the access switch connected to the protected device, or configuring the MAC address of the protected device as the protection MAC address.

Step 303: when interacting the network topology information with other switches in the layer 2 ring network except the protected device, the access switch takes the identifier of itself as the identifier of the switch corresponding to the protection MAC address, and releases the protection MAC address and the identifier of the switch corresponding to the protection MAC address as a part of network topology information to other switches.

Step 304: when computing the ring network topology information, the switch in the ring network may compute a local outgoing interface of the protection MAC address, so that the outgoing interface of the protection MAC address can be determined by the actual network topology information of the layer 2 ring network.

Wherein, the interface of the access switch of the protected device connected to the protected device may be taken as the outgoing interface on the access switch corresponding to the protection MAC address of the protected device. Since the access switch directly connected to the protected device will not be changed, the outgoing interface on the access switch corresponding to the protection MAC address usually maintains unchanged.

The method for computing the outgoing interface on other switch corresponding to the protection MAC address is as follows: firstly, since each switch only has two interfaces in the layer 2 ring network, the outgoing interface of the protection MAC address is one of the two interfaces; secondly, in order to prevent the traffics forming a ring, the ring network computes a ring network blocking point to block the ring, and all the traffics transmitted to the ring network blocking point will be discarded. Thus, when the outgoing interface of the MAC entry corresponding to the protection MAC address is selected on the switch, an interface having a ring network blocking point in the path to the access switch cannot be selected, otherwise all the traffics will be discarded. Therefore, an interface having no ring network blocking point in the path from the switch to the access switch of the protection MAC address may be selected as the outgoing interface of the protection MAC address. For example, if a certain interface of the switch has a ring network blocking point in the path to the access switch corresponding to the protection MAC address, the distance from the interface to the access switch corresponding to the protection MAC address may be determined as infinite, thus after other switch computes the distances from its two interfaces in the ring network to the access switch, an interface having a shorter distance to the access switch may be selected as the outgoing interface corresponding to the protection MAC address on the switch.

Figure 1B:
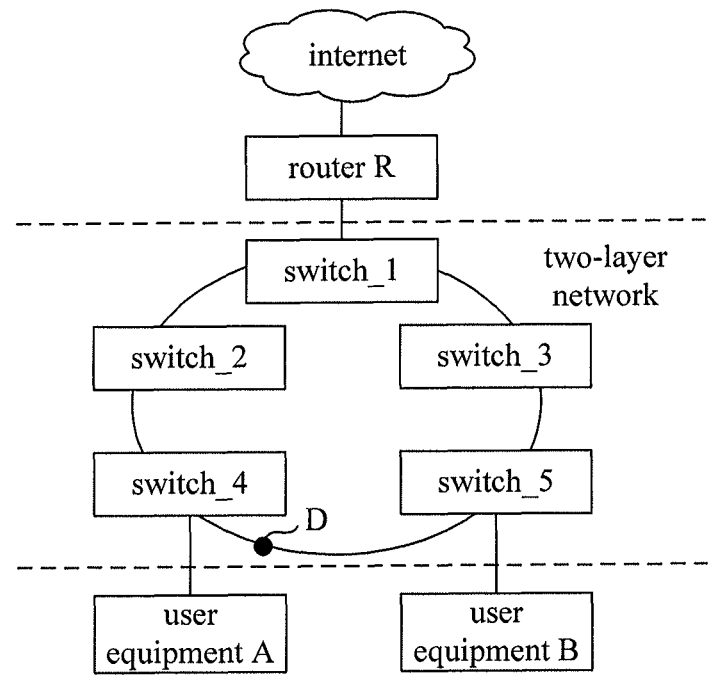
FIG. 1b is a network schematic diagram of protecting the MAC address of a router using a static configuration.

Referring to FIG. 1b, under an initial state, all the links of the layer 2 ring network are normal, wherein the access switch of router R is switch_1, the access switch of user equipment B is switch_5, and the ring network blocking point D is an interface on switch_4 for connecting with switch_5. On switch_1, the outgoing interface of the MAC entry corresponding to the protection MAC address of router R is an interface of switch_1 for connecting with router R. On switch_5, the outgoing interface of the MAC entry corresponding to the protection MAC address of user equipment B is an interface of switch_5 for connecting with user equipment B.

According to the above principle, in FIG. 1b, the outgoing interfaces of the MAC entries corresponding to the protection MAC addresses of router R on respective switches in the ring network are as follows:

switch_1: an interface connected to router R;
switch_2: an interface connected to switch_1;
switch_3: an interface connected to switch_1;
switch_4: an interface connected to switch_2;
switch_5: an interface connected to switch_3.

In addition, the outgoing interfaces of the MAC entries corresponding to the protection MAC address of user equipment B on respective switches in the ring network are as follows:

switch_1: an interface connected to switch_3;
switch_2: an interface connected to switch_1;

switch_3: an interface connected to switch_5;
switch_4: an interface connected to switch_2;
switch_5: an interface connected to user equipment B.

step 305: if the topology of the ring network is changed due to the change of the network topology or failure of a certain link, the switch shall re-compute the network topology, and compute and update the outgoing interface of the MAC entry corresponding to the protection MAC address. The change of the ring network blocking point may cause a failure of outgoing interface of the MAC entry corresponding to the protection MAC address on the switch, and each switch in the ring network except the access switch shall synchronously compute and update the outgoing interface of the MAC entry corresponding to the protection MAC address, while computing the network topology information of the layer 2 ring network, wherein since the interface of the access switch connected to the protected device is the outgoing interface of the protection MAC address, it usually maintains unchanged, therefore, the access switch does not need to update the outgoing interface of the protection MAC address.

If the topology of the layer 2 ring network is changed, referring to FIG. 1c, assuming that the link between switch_1 and switch_2 fails, and the ring network blocking point D is the interface on switch_1 for connecting with switch_2; after obtaining the topology change, each switch of the ring network may re-compute the outgoing interface of the protection MAC address according to the network topology information and update the MAC entry.

Wherein, the outgoing interfaces of the MAC entries corresponding to the protection MAC addresses of router R on respective switches are as follows:
switch_1: an interface connected to router R;
switch_2: an interface connected to switch_4;
switch_3: an interface connected to switch_1;
switch_4: an interface connected to switch_5;
switch_5: an interface connected to switch_3.

Wherein, since switch_1 is the access switch of router R, switch_1 does not need to re-compute the outgoing interface of the protection MAC address of router R on switch_1, and the outgoing interfaces of the MAC entries corresponding to the protection MAC addresses on switch_3 and switch_5 maintain unchanged, original outgoing interfaces are maintained.

In addition, the outgoing interfaces of the MAC entries corresponding to the protection MAC addresses of user equipment B on respective switches are as follows:
switch_1: an interface connected to switch_3;
switch_2: an interface connected to switch_4;
switch_3: an interface connected to switch_5;
switch_4: an interface connected to switch_5;
switch_5: an interface connected to user equipment B.

Wherein, since switch_5 is the access switch of user equipment B, switch_5 does not need to re-compute the outgoing interface of the protection MAC address of user equipment B on switch_5, and the outgoing interfaces of the MAC entries corresponding to the protection MAC addresses on switch_1 and switch_3 maintain unchanged, original outgoing interfaces are maintained.

When the network topology is changed, the switch in the layer 2 ring network only needs to learn the network topology change and new ring network blocking point, and compute the outgoing interface of the protection MAC address according to the new ring network blocking point and the identifier of the access switch of the protection MAC address, thereby reducing the time for computing the outgoing interface of the MAC entry corresponding to the protection MAC address.

The embodiment takes the MAC address of the protected device as the protection MAC address, determines the outgoing interface corresponding to the protection MAC address on the switch in the layer 2 ring network according to the network topology information including the protection MAC address of the protected device, the identifier of the switch corresponding to the protection MAC address and the identifier of each switch in the layer 2 ring network, and synchronously updates the outgoing interface of the MAC entry corresponding to the protection MAC address when the topology of the layer 2 ring network is changed, thereby ensuring the protected device to correctly send and receive messages to meet the topology change of the layer 2 ring network.

Figure 4:
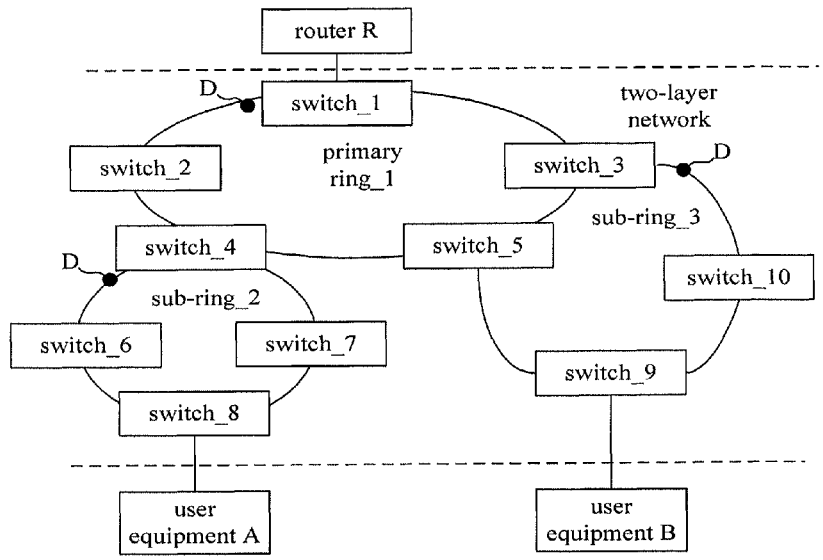
FIG. 4 is a schematic diagram where the MAC address protection method according to an embodiment of the present disclosure is applied to multiple rings.

FIG. 4 is a schematic diagram where the MAC address protection method according to an embodiment of the present disclosure is applied to multiple rings. As shown in FIG. 4, the layer 2 ring network includes a primary ring and at least one sub-ring, the primary ring and the sub-ring may be rings tangent to or intersected with each other, wherein regarding the primary ring, please refer to relevant descriptions in the above embodiments for the release of the protection MAC address and the computation of the outgoing interface.

Regarding the sub-ring, since the traffic of each switch in a sub-ring is forwarded through a switch connecting the sub-ring and the primary ring, thus the switch connecting the sub-ring and the primary ring is corresponding to the access switch of the sub-ring. When a switch in the sub-ring computes the outgoing interface of the MAC entry corresponding to the protection MAC address, it only needs to take the switch connecting the sub-ring and the primary ring as the access switch.

For example, in case of tangent rings, after receiving the protection MAC address of the primary ring and the identifier of corresponding switch, the switch connecting the sub-ring and the primary ring releases the protection MAC address of the primary ring to each switch in the sub ring, modifies the identifier of the switch corresponding to the protection MAC address into the identifier of the switch connecting the sub-ring and the primary ring, and releases the modified identifier of the switch in the sub ring. For example, referring to FIG. 4, after receiving the protection MAC address of router R and the identifier of corresponding switch (i.e., switch_1), switch_4 connecting primary ring_1 and sub-ring_2 may modify the identifier of switch_1 corresponding to the protection MAC address into the identifier of switch_4 itself, and release the protection MAC address and the identifier of switch_4 to other switch_6, switch_7 and switch_8 in sub-ring_2. On the other hand, after receiving the protection MAC address of user equipment A and the identifier of corresponding switch (i.e., switch_8), switch_4 may modify the identifier of switch_8 corresponding to the protection MAC address into the identifier of switch_4, and release the protection MAC address and the identifier of switch_4 to switch_1, switch_2, switch_3 and switch_5 in sub-ring_3. Thus, the outgoing interface of the MAC entry corresponding to the protection MAC address of each protected device in the layer 2 ring network with a tangent ring structure can be determined and notified to each switch in the layer 2 ring network.

In case of intersected rings, the sub-ring has at least two switches connected to the primary ring, thus when receiving the protection MAC address, the switches in the sub-ring simultaneously receive identifiers of two corresponding switches, and each of the identifiers needs to be stored. The outgoing interface of the MAC entry corresponding to the protection MAC address is computed just by judging the ring network blocking point, after identifying the switches corresponding to two interfaces in the ring respectively, according to the network topology information of the layer 2 ring network. For example, switch_9 may receive the protection MAC addresses released by switch_3 and switch_5, while receiving identifiers of two corresponding switches, i.e., identifiers of switch_3 and switch_5. Switch_9 may store the protection MAC addresses and corresponding identifiers of switch_3 and switch_5. When the outgoing interface of the protection MAC address is computed, switch_9 may acquire, according to the network topology information of the layer 2 ring network, that the interface of switch_3 is an interface for connecting with switch_10, there is a ring network blocking point in the path, and the interface cannot be selected as the outgoing interface of the protection MAC address. Therefore, switch_5 is selected as the switch corresponding to the protection MAC address, and the interface connected to switch_5 is selected as the outgoing interface of the MAC entry corresponding to the protection MAC address.

Moreover, in case of multi-level sub-rings, i.e., one sub-ring further has sub-rings, the processing mechanism is the same. It only requires the switch connecting the sub-ring to release the protection MAC address to the subordinate sub-rings, and modify the identifier of a switch corresponding to the protection MAC address into the identifier of the present switch. When the network topology of a sub-ring is changed, it only requires the switch in the sub-ring to compute the outgoing interface of the MAC entry corresponding to the protection MAC address, while other sub-rings and the primary ring do not need a computation again.

The embodiment takes the MAC address of the protected device as the protection MAC address, determines the outgoing interface corresponding to the protection MAC address on the switch of the layer 2 ring network according to the network topology information including the protection MAC address and the identifier of the corresponding switch, and synchronously updates the outgoing interface of the MAC entry corresponding to the protection MAC address when the topology of the layer 2 ring network is changed, so as to ensure a correct forwarding path for the protected device connected to the ring network, thus the protected device can correctly forward messages to meet the topology change of the layer 2 ring network. When the network topology is changed, each switch in the layer 2 ring network can synchronously computes the outgoing interface of the MAC entry corresponding to the protection MAC address, and the access switch does not need to release the protection MAC address again, thus the convergence performance of the network is improved to meet the MAC protections under complicated networking of single ring, multi-ring, multi-level sub-rings, etc. In addition, the protected device may be a router or gateway uplink accessed by the ring network, or a user equipment or network downlink to the protected ring network, thereby protecting not only the MAC address of the router or gateway uplink accessed by the ring network, but also the MAC address of the user equipment or network downlink to the ring network.

Figure 5:
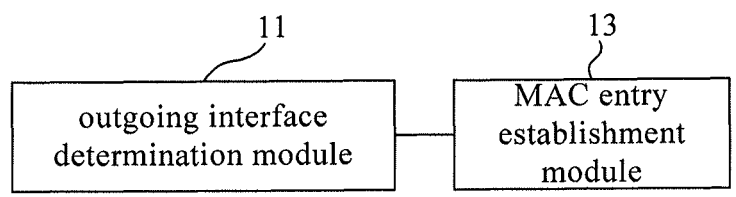
FIG. 5 is a structural diagram of a switch according to an embodiment of the present disclosure.

In order to implement the above method, the embodiments of the present disclosure provide a switch. FIG. 5 illustrates a structure diagram of a switch according to an embodiment of the present disclosure, wherein the switch includes:

an outgoing interface determination module 11 configured to obtain network topology information of a layer 2 ring network, the network topology information of the layer 2 ring network includes a protection MAC address of a protected device, an identifier of a switch corresponding to the protection MAC address, and an identifier of each switch in the layer 2 ring network, wherein the protection MAC address is the MAC address of the protected device; and an MAC entry establishment module 13 configured to determine a local outgoing interface of the protection MAC address of the protected device according to the network topology information, establish and store an outgoing interface of an MAC entry corresponding to the protection MAC address according to the local outgoing interface of the protection MAC address.

For example, after receiving the network topology information of the layer 2 ring network, the switch may identify from the network topology information the protection MAC address and the identifier of an access switch that releases the protection MAC address. Next, the outgoing interface determination module 11 may store all the protection MAC addresses and the identifiers of corresponding switches in the ring network, and synchronously compute the outgoing interface of the protection MAC address in response to a ring network computation or topology change event during the ring network computation or topology change computation. After the computation of the outgoing interface of the protection MAC address is completed, the MAC entry establishment module 13 may establish and store the outgoing interface of the MAC entry corresponding to the protection MAC address according to the local outgoing interface of the protection MAC address.

Figure 6:
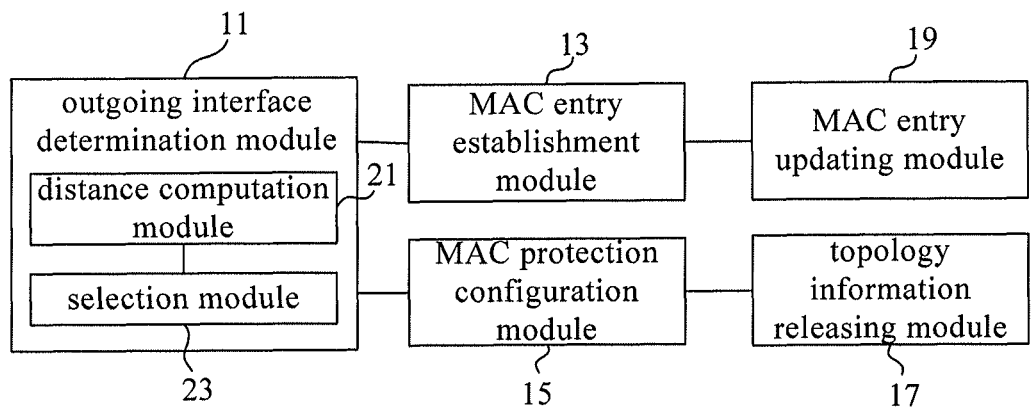
FIG. 6 is a structural diagram of another switch according to an embodiment of the present disclosure.

On the basis of the embodiment as illustrated in FIG. 5 of the present disclosure, FIG. 6 illustrates a structure diagram of another switch according to an embodiment of the present disclosure, wherein the outgoing interface determination module 11 of the switch may include:

a distance computation module 21 configured to compute distances from two interfaces of the switch in the layer 2 ring network to an access switch corresponding to the protection MAC address; and a selection module 23 configured to select an interface having a shorter distance to the access switch corresponding to the protection MAC address, as the local outgoing interface of the protection MAC address; wherein if there is a ring network blocking point in the path from an interface to the access switch corresponding to the protection MAC address, the distance between the interface and the access switch corresponding to the protection MAC address is infinite.

Further, the switch may further include:

an MAC protection configuration module 15 configured to enable an MAC protection on an interface of the protected device directly connected to the access switch, or configure the MAC address of the protected device as the protection MAC address on the access switch, wherein the interface of the protected device directly connected to the access switch serves as the outgoing interface corresponding to the protection MAC address on the access switch. For example, the user can manually configure the protection MAC address on the protected device. After enabling the MAC protection on an interface of the access switch directly connected to the protected device, the MAC protection configuration module 15 may automatically take an MAC address learnt at the interface with the enabled MAC protection as the protection MAC address, and collect the MAC address of each protected device (router, user equipment, network, etc.) under the interface as the protection MAC address.

Further, in order to reduce the time for computing the outgoing interface of the MAC entry corresponding to the protection MAC address, it only requires learning the topology change event and new ring network blocking point, and the access switch does not need to release the protection MAC address again. The switch may further include:

a topology information releasing module 17 configured to release the network topology information to other switches in the layer 2 ring network, wherein the network topology information includes the protection MAC address of the protected device and the identifier of the switch corresponding to the protection MAC address, and the other switches are those not directly connected to the protected device. For example, when releasing the network topology information of the layer 2 ring network, the topology information releasing module 17 carries the protection MAC address in the network topology information of the layer 2 ring network, and releases the identifier of the present switch to the other switches as the identifier of the switch corresponding to the protection MAC address, so that the other switches can identify the protection MAC address and the switch corresponding to the protection MAC address.

Further, the topology of the layer 2 ring network may be changed, and the switch may further include:

an MAC entry updating module 19 configured to update the outgoing interface of the MAC entry corresponding to the protection MAC address locally stored according to the changed network topology information and a new ring network blocking point when the topology of the layer 2 ring network is changed.

In addition, the layer 2 ring network may have a single ring or multiple rings, and different network structures have different switches corresponding to the protection MAC address. For example:

If the layer 2 ring network has a single ring, the switch corresponding to the protection MAC address is the access switch.

If the layer 2 ring network includes a primary ring and at least one level of sub-rings, in any sub-ring the switch corresponding to the protection MAC address is a switch connecting the sub-ring with the higher level ring network, or one of two switches connecting the sub-ring with the higher level ring network.

For the working flows and working principles of various modules in the switch provided by the embodiments of the present disclosure, please refer to the descriptions in the above method embodiments, and herein are omitted.

The embodiment takes the MAC address of the protected device as the protection MAC address to prevent the MAC address of the ring network from being attacked; determines the outgoing interface corresponding to the protection MAC address on the switch in the layer 2 ring network according to the network topology information including the protection MAC address of the protected device, the identifier of the switch corresponding to the protection MAC address, and the identifier of each switch in the layer 2 ring network; and when the topology of the layer 2 ring network is changed, synchronously updates the outgoing interface of the protection MAC address to ensure a correct forwarding path for the protected device connected to the ring network, thus the protected device can correctly forward messages to meet the topology change of the layer 2 ring network. In addition, when the network topology is changed, each switch in the layer 2 ring network can synchronously compute the outgoing interface of the MAC entry corresponding to the protection MAC address, and the switch corresponding to the protection MAC address does not need to release the protection MAC address again, thus the convergence performance of the network is improved. The embodiment of the present disclosure can be applied to the MAC protection under complicated networking of single ring, multi-ring, multi-level sub-rings, etc. In addition, the protected device may be a router or gateway uplink accessed by the ring network, or a user equipment or network downlink to the protected ring network, thereby protecting not only the MAC address of the router or gateway uplink accessed by the ring network, but also the MAC address of the user equipment or network downlink to the ring network.

A person skilled in the art shall be appreciated that all or a part of steps for implementing the above method embodiments may be completed by instructing relevant hardware such as a hardware processor through a program that may be stored in a computer readable storage medium, and when being executed, the program instructs the processor to perform the acts including the above method embodiments. The storage medium may include various mediums capable of storing program codes, such as ROM, RAM, magnetic disk and optical disk.

Finally to be noted, the above embodiments are just used to describe, rather than limit, the solutions of the present disclosure. Although the present disclosure is described with reference to the aforementioned embodiments, a person skilled in the art would appreciate that the solutions of the aforementioned embodiments can be modified, or some features thereof can be equivalently replaced. Those modifications or replacements do not make essences of corresponding solutions deviate from the spirit and scope of the solution of each embodiment of the present disclosure.

The invention claimed is:

1. A Medium Access Control (MAC) address protection method to protect a layer 2 ring network from counterfeiting a protection MAC address of a protected device, wherein the protected device comprises one of: a user terminal and a network device, the method comprising:

obtaining, by each of a plurality of switches in the layer 2 ring network, network topology information of the layer 2 ring network, wherein the network topology information of the layer 2 ring network comprises the protection MAC address of the protected device, an identifier of a switch corresponding to the protection MAC address, and an identifier of each of the switches in the layer 2 ring network, the protection MAC address is the MAC address of the protected device; wherein an identifier of a switch is used to uniquely identify the switch, and an identifier of one switch is different from an identifier of another switch;

determining, by each of the switches in the layer 2 ring network, a local outgoing interface of the protection MAC address of the protected device according to the network topology information, establishing and storing an outgoing interface of an MAC entry corresponding to the protection MAC address according to the local outgoing interface of the protection MAC address, wherein the determining comprises: computing, by each switch of the switches in the layer 2 ring network, distances from two interfaces of the switch to an access switch corresponding to the protection MAC address; and selecting an interface having a shorter distance to the access switch as the local outgoing interface of the protection MAC address; and wherein when there is an ring network blocking point in the path from an interface to the access switch, the distance between the interface and the access switch is defined as infinite;

wherein the switch corresponding to the protection MAC address comprises one of:

an access switch of the protected device when the layer 2 ring network has a single ring, wherein the access switch is a switch directly connected to the protected device; and a switch connecting a sub-ring with a higher level ring network, or one of two switches connecting the sub-ring with the higher level ring network when the layer 2 ring network includes a primary ring and at least one level of sub-rings.

2. The MAC address protection method according to claim 1, further comprising:
enabling an MAC protection on an interface of the protected device directly connected to the access switch, or configuring the MAC address of the protected device as the protection MAC address on the access switch, wherein an interface of the access switch directly connected to the protected device serves as an outgoing interface corresponding to the protection MAC address on the access switch; and
releasing, by the access switch, the network topology information to other switches in the layer 2 ring network, and the other switches are those not directly connected to the protected device.

3. The MAC address protection method according to claim 1, further comprising
updating the outgoing interface of the MAC entry corresponding to the protection MAC address locally stored according to the changed network topology information and a new ring network blocking point, when the topology of the layer 2 ring network is changed.

4. The MAC address protection method according to claim 1, wherein the switch connecting the sub-ring with a higher level ring network comprises one of two switches connecting the sub-ring with the higher level ring network when the layer 2 ring network includes a primary ring and at least one level of sub-rings.

5. A switch that protects a layer 2 ring network from counterfeiting a protection MAC address of a protected device, wherein the protected device comprises one of: a user terminal and a network device, and the switch comprises:
a processor; and
interfaces,
the processor configured to:
obtain, network topology information of a layer 2 ring network, wherein the network topology information of the layer 2 ring network comprises the protection MAC address of the protected device, an identifier of a switch corresponding to the protection MAC address, and an identifier of each of a plurality of switches in the layer 2 ring network, the protection MAC address is the MAC address of the protected device; wherein an identifier of a switch is used to uniquely identify the switch, and an identifier of one switch is different from an identifier of another switch;
determine a local outgoing interface of the protection MAC address of the protected device according to the network topology information, establish and store an outgoing interface of an MAC entry corresponding to the protection MAC address according to the local outgoing interface of the protection MAC address, wherein to determine a local outgoing interface of the protection MAC address of the protected device according to the network topology information, the processor is configured to: compute distances from two interfaces of the switch in the layer 2 ring network to the access switch; and select an interface having a shorter distance to the access switch as the local outgoing interface of the protection MAC address, and wherein when there is a ring network blocking point in the path from an interface to the access switch, the distance between the interface and the access switch corresponding to the protection MAC address is defined as infinite;
wherein the switch corresponding to the protection MAC address comprises one of:
an access switch of the protected device when the layer 2 ring network has a single ring, wherein the access switch is a switch directly connected to the protected device; and
a switch connecting a sub-ring with a higher level ring network, or one of two switches connecting the sub-ring with the higher level ring network when the layer 2 ring network includes a primary ring and at least one level of sub-rings.

6. The switch according to claim 5, wherein the processor is further configured to:
enable an MAC protection on an interface of the protected device directly connected to the access switch, or configure the MAC address of the protected device as the protection MAC address on the access switch, wherein an interface of the access switch directly connected to the protected device serves as an outgoing interface corresponding to the protection MAC address on the access switch;
release the network topology information to other switches in the layer 2 ring network, and the other switches are those not directly connected to the protected device; and
update the outgoing interface of the MAC entry corresponding to the protection MAC address locally stored according to the changed network topology information and a new ring network blocking point when the topology of the layer 2 ring network is changed.

7. The switch according to claim 5, wherein the switch connecting the sub-ring with a higher level ring network comprises one of two switches connecting the sub-ring with the higher level ring network when the layer 2 ring network includes a primary ring and at least one level of sub-rings.

* * * * *